Figure 1:
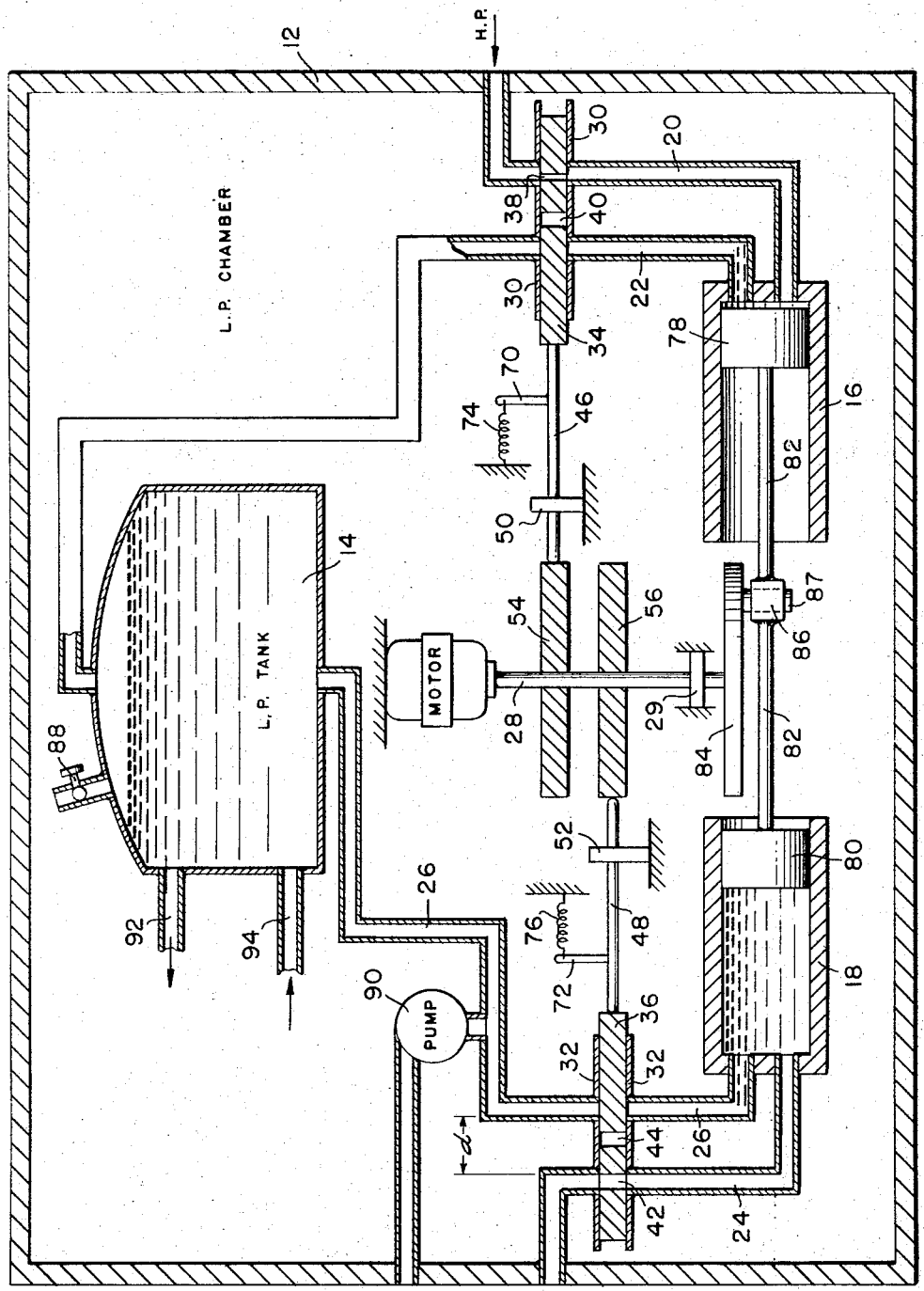

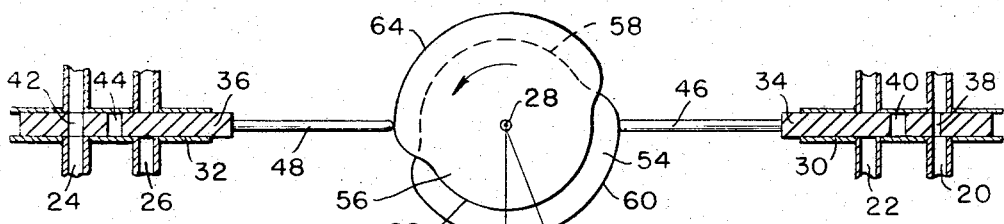
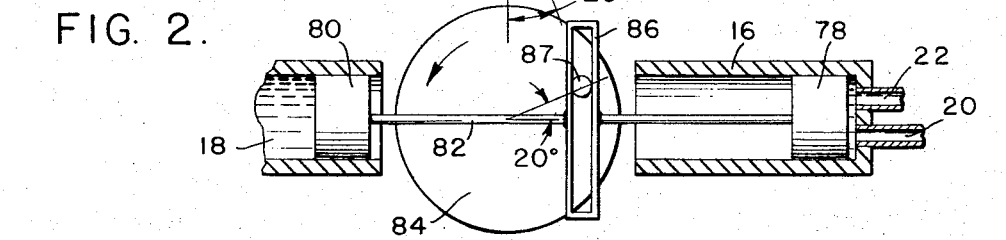
FIG. 2.
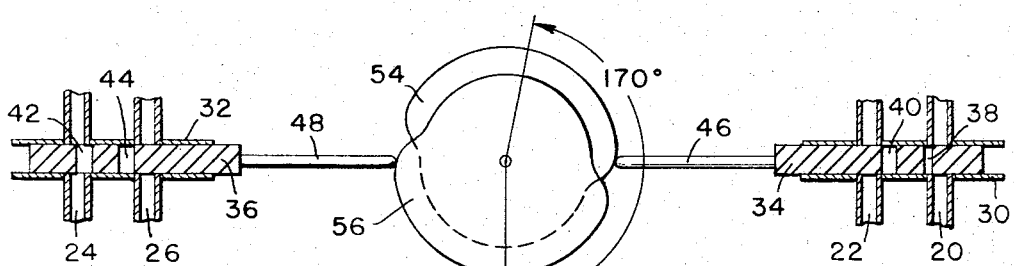
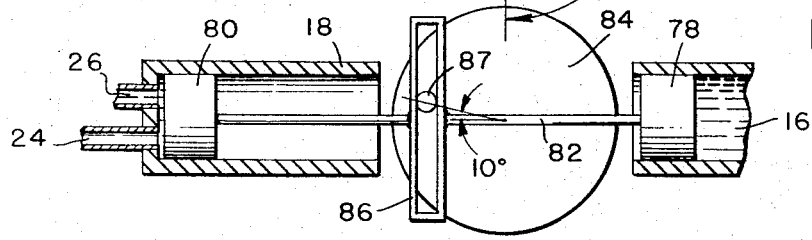
FIG. 3.
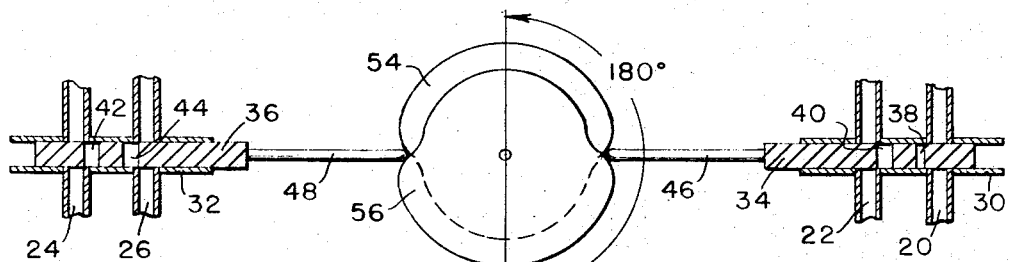
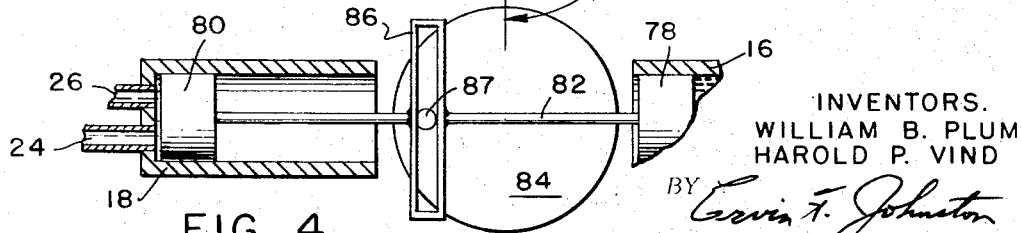
FIG. 4.
INVENTORS.
WILLIAM B. PLUM
HAROLD P. VIND
ATTORNEY.

INVENTORS.
WILLIAM B. PLUM
HAROLD P. VIND

ATTORNEY.

United States Patent Office 3,295,454
Patented Jan. 3, 1967

3,295,454
PRESSURE REDUCING PUMPING SYSTEM
William B. Plum, Ventura, and Harold P. Vind, Oxnard, Calif., assignors to the United States of America as represented by the Secretary of the Navy
Filed Jan. 27, 1965, Ser. No. 428,592
10 Claims. (Cl. 103—57)

The invention described herein may be manufactured and used by or for the Government of the United States of America for governmental purposes without the payment of any royalties thereon or therefor.

The present invention relates to a pressure reducing pumping system and more particularly to an economical pressure reducing pumping system for circulating a fluid from a high pressure fluid source to a low pressure fluid source and then returning the fluid to the high pressure fluid source. Such a system may be used in many various types of environments, however the invention will be described herein for use within a deep sea chamber.

Man has long dreamed of constructing industrial, agricultural and naval installations on the floor of the ocean. Only recently has there been any significant effort to construct manned submerged chambers to bring this dream to a reality. One of the problems to be overcome in providing a manned submerged chamber is to provide a suitable atmosphere for breathing. One proposal to overcome this problem has been to recover oxygen from the sea water by bringing the sea water into the chamber, processing it and then discharging the deoxygenated sea water back into the sea environment. When the interior of the submerged chamber is at atmospheric pressure the intake and discharge of sea water becomes a problem because of the pressure differential between the outside sea environment and the lower pressure within the chamber. The depth of the water does not have to be very much before a relatively powerful pump is required to discharge the deoxygenated sea water from the chamber into the high pressure outside sea environment.

The present invention overcomes this problem by providing a pressure reducing pumping system which couples the high pressure forces at the chamber intake and discharge openings so that the pumping force required is substantially only that which is necessary to overcome the friction of the components of the system. The system may include a piston cylinder means; a pair of conduits connected to the piston cylinder means and communicating the piston cylinder means with the high pressure sea environment; another pair of conduits connected to the piston cylinder means, this pair of conduits being in communication with one another and communicating the piston cylinder means with the chamber low pressure environment; valve means for opening the high pressure conduits and closing the low pressure conduits during one cycle of operation and closing the high pressure conduits and opening the low pressure conduits during a second cycle of operation; and means synchronized with the valve means and including piston means disposed within the piston cylinder means for simultaneously taking sea water in and discharging sea water from the piston cylinder means during said one cycle of operation and circulating the sea water through the pair of low pressure conduits during the second cycle of operation.

Accordingly, an object of the present invention is to provide an economical pressure reducing pumping system for circulating a fluid from a high pressure fluid source to a low pressure fluid source and then returning the fluid to the high pressure fluid source;

Another object of the present invention is to provide an economical pressure reducing pumping system located within a low pressure undersea chamber for circulating sea water from the high pressure outside sea water environment to a low presure tank which is also located within the chamber and then returning the sea water to the high pressure outside sea water environment;

A further object is to provide a pressure reducing pumping system for circulating a fluid from a high pressure fluid source to a low pressure fluid source and then returning the fluid to the high pressure fluid source without any substantial build up of pressure within the low pressure fluid source from the high pressure fluid source;

Other objects, advantages and novel features of the invention will become apparent from the following detailed description of the invention when considered in conjunction with the accompanying drawings wherein:

FIG. 1 is a schematic view, shown partly in cross section, of the pumping system and the low pressure undersea chamber;

FIGS. 2 through 6 each illustrate schematic corresponding views of the flat side of the cams and the valves cooperating therewith as well as the flat side of the drive wheel and the pistons cooperating therewith.

Referring now to the drawings where like reference numerals designate like or similar parts throughout the several views there is shown in FIG. 1 a pressure reducing pumping system 10, which is located within a low pressure undersea chamber 12, for circulating sea water from the high pressure outside sea water environment to a low pressure tank 14, which is also located within the chamber, and then returning the water to the high pressure outside sea water environment. When the chamber 12 is to be used as a manned undersea installation it is desirable that the pressure therein be maintained at one atmosphere. If the chamber 12 is at one atmosphere and is submerged to a depth of 300 feet within the ocean the hydrostatic pressure on the chamber will be 10 atmospheres of if the chamber is submerged to a depth of 600 feet the hydrostatic pressure increases to 20 atmospheres. Large pumps would be required within the chamber to pump water out of the chamber against such sea pressures. The pressure reducing pumping system 10 eliminates the need of large pumps by working the chamber inlet and outlet sea pressure forces against one another so that the pump power required is substantially only that which is necessary to overcome the friction of the components of the pumping system.

The pressure reducing pumping system 10 has a piston cylinder means which may include a pair of piston cylinders, one cylinder being a chamber intake cylinder 16 and the other cylinder being a chamber discharge cylinder 18. Each of the piston cylinders may have an open end and a closed end and the cylinders may be longitudinally aligned with respect to one another with the open ends facing one another.

A pair of conduits 20 and 22 may extend through the closed end of the intake cylinder 16, the conduit 20 being a high pressure chamber intake conduit and opening through the chamber 12 to the outside sea water environment and the other conduit 22 being a low pressure tank intake conduit and opening into the low pressure tank 14. In a like manner a pair of conduits 24 and 26 may extend through the closed end of the discharge piston cylinder 18, the conduit 24 being a high pressure chamber discharge conduit and opening through the chamber 12 to the outside sea water environment and the other conduit 26 being a low pressure tank discharge conduit and opening into the low pressure tank 14. The conduits within each pair may have portions which extend substantially parallel with respect to one another and substantially perpendicular to the longitudinal axis of the piston cylinders 16 and 18 for a purpose to be described hereinafter.

It is important that the chamber intake and discharge conduits 20 and 24 open and close the piston cylinders 16 and 18 to the outside sea water environment and that the tank intake and discharge conduits 22 and 26 open and close the low pressure tank 14 respectively to the same environment at such intervals that the outside environment pressure at the chamber conduits 20 and 24 will work against one another within the piston cylinders 16 and 18. This has been accomplished by valve means which may be connected to the parallel portions of the conduits, as mentioned hereinabove, for opening the high pressure chamber intake and discharge conduits 20 and 24 and closing the low pressure tank intake and discharge conduits 22 and 26 during one cycle of operation and closing the high pressure chamber intake and discharge conduits 20 and 24 and opening the low pressure tank intake and discharge conduits 22 and 26 during another cycle of operation. Each cycle of operation may take place within a 180° rotation of a motor output shaft 28 which will become more clear hereinafter. If desired, the motor shaft 28 may be journalled with a fixed bearing 29 for support purposes.

The valve means may include a pair of cylindrical tubes 30 and 32, the tube 30 extending perpendicularly through and opening into the previously mentioned parallel portions of the chamber intake and tank intake conduits 20 and 22 and the cylindrical tube 32 extending in a like manner through and opening into the previously mentioned parallel portions of the chamber discharge and tank discharge conduits 24 and 26. Slidably disposed within the cylindrical tubes 30 and 32 are cylindrical plungers 34 and 36, the plunger 34 having transverse openings 38 and 40 which are capable of opening the chamber intake and tank intake conduits 20 and 22 respectively and the plunger 36 having transverse openings 42 and 44 which are capable of opening the chamber discharge and tank discharge conduits 24 and 26 respectively. The spacing between the transverse plunger openings 38 and 40 is such that neither of the conduits 20 nor 22 is open until the other conduit has been entirely closed. In a like manner the spacing between the plunger openings 42 and 44 is such that neither of the conduits 24 nor 26 is open unless the other conduits is entirely closed. It is desirable, however, that the distance between the outermost surfaces of the plunger openings 42 and 44 be equal to the distance $d$ between the interior surfaces of the conduits 24 and 26 so that immediately after the closing of one of the conduits 24 or 26 the other conduit is opened. With respect to the plunger openings 38 and 40 it is desirable that the chamber intake conduit 20 be closed for a short period of time prior to the opening of the tank intake conduit 22 for a purpose which is to be described more fully hereinafter. This may be accomplished by spacing the plunger openings 38 and 40 in a similar manner as the other plunger openings 42 and 44 except the plunger opening 38 may be made slightly smaller in diameter so that the chamber intake conduit 20 will be closed for a short period of time prior to the opening of the tank intake conduit 22.

A pair of cam follower actuating rods 46 and 48 may be connected longitudinally to the ends of the plungers 34 and 36 respectively and, if desired, bearing blocks 50 and 52 may be provided for the actuating rods 46 and 48 respectively for support purposes. A pair of cams 54 and 56 may be mounted in a spaced relationship along the motor shaft 28 for actuating the plungers 34 and 36, respectively, through the rods 46 and 48 so that the previously mentioned cycles of operation can be carried out. It should be noted that the cylindrical tubes 30 and 32 are actually offset from one another so as to be positioned substantially opposite the cams 54 and 56, respectively, thereby enabling the camming forces to be transmitted axially along the actuating rods 46 and 48. As shown in FIG. 2, the cam 54 has a smaller generally semi-circular cam face 58 which merges gradually into a larger generally semi-circular cam face 60. In a like manner the cam 56 has a smaller generally semi-circular cam face 62 which merges gradually into a larger generally semi-circular cam face 64. In the present embodiment the merging curve between the generally semi-circular cam faces of each cam occurs over a 20° arc. If the diameters of the plunger openings 40, 42 and 44 are equal the radial distance between the smaller and larger cam faces of each cam 54 and 56 should be equal to twice the diameter of the latter mentioned plunger openings. Such a construction will ensure that upon the closing of either one of the conduits 24 or 26 the other conduit will immediately open and the smaller diameter of the plunger opening 38 will ensure that the conduit 20 will be closed for a short period of time prior to the opening of the conduit 22.

As shown in FIG. 2, the cams 54 and 56 are mounted on the motor shaft 28 with their configurations located geometrically opposite with respect to one another, that is, the smaller cam face 58 of the cam 54 is located opposite the larger cam face 64 of the cam 56 and the larger cam face 60 of the cam 54 is located opposite the smaller cam face 62 of the cam 56. This positioning of the cams 54 and 56 causes the cylindrical plungers 34 and 36 to move simultaneously outwardly during a first cycle of operation and move simultaneously inwardly during a second cycle of operation. As shown in FIGS. 2 through 6, the operation of the cams will open the chamber intake and discharge conduits 20 and 24 and close the tank intake and discharge conduits 22 and 26 during the first cycle of operation and close the chamber intake and discharge conduits 20 and 24 and open the tank intake and discharge conduits 22 and 26 during the second cycle of operation. If a line 66 through the center of the smaller cam face 62 of the cam 56 can be considered as a reference line and a mark 68 can be considered as a zero reference mark and if the motor shaft 28 rotates in a counterclockwise direction as shown in FIG. 2, the first cycle of operation would be the rotation of the reference line 66 between the zero reference mark 68 and 180° and the second cycle of operation would be the rotation of the reference line 66 between 180° back around to the zero reference mark 68. In order that these cycles of operation are carried out precisely it is necessary that the transcending merging curved portions between the smaller and larger cam faces of each of the cams 54 and 56 actuate the rods 46 and 48 to a position midway between their total range of movement when the reference line 66 is located at either the zero reference mark or 180° therefrom (see FIGS. 6 and 4). In either of these positions all of the conduits 20, 22, 24 and 26 are closed off.

In order that the rods 46 and 48 follow the cams 54 and 56, respectively, the rods may have upstanding flanges 70 and 72 which are connected to fixed supports by tension springs 74 and 76, respectively, so that the rods 46 and 48 are at all times biased against their respective cams.

In order to circulate water to the system a water circulation means, which is synchronized with the valve means, may be provided for taking sea water into the intake cylinder 16 through the high pressure chamber intake conduit 20 and discharging sea water from the discharge cylinder 18 through the high pressure chamber discharge conduit 24 during the first cycle of operation and discharging water from the intake cylinder 16 into the low pressure tank 14 through the low pressure intake conduit 22 and withdrawing water from the tank 14 into the discharge cylinder 18 through the low pressure tank discharge conduit 26 during the second cycle of operation. The water circulation means may include a pair of pistons 78 and 80 which are slidably disposed within the piston cylinders 16 and 18, respectively, for reciprocatory motion therein. The pistons 78 and 80 are interconnected by a rigid piston rod 82 which is connected at one end to the piston 78 and at an opposite end to the piston 80. The use of the rigid piston rod 82 for interconnecting the pistons 78 and 80 causes the high pressures within the piston cylinders 16 and 18 to oppose one another when the cylinders are in communication with the high pressure outside seat water environment. It is to be noted that the same effect could be obtained by reconstructing the pumping system with only one piston cylinder and a piston disposed therein with a driving means working from one end of the cylinder. In the embodiment shown in FIG. 1, however, the driving means is located between the pair of piston cylinders 16 and 18 for synchronization purposes.

If a single piston cylinder was employed the synchronization between the water circulation means and the valve means could be accomplished by rotating electrical contacts.

The pair of pistons 78 and 80 are synchronized with the valve means by connecting the rigid piston rod 82 to the motor shaft 28. This may be accomplished by mounting a drive wheel 84 centrally upon the motor shaft 28 and interconnecting the drive wheel 84 to the piston rod 82 by a Scotch yoke 86. The Scotch yoke 86 is a slotted yoke which is rigidly interposed in the piston rod 82 in a transverse direction. A perpendicularly extending pin 87, mounted on the drive wheel 84, is slidably received within the slotted yoke and causes the pistons 78 and 80 to reciprocate when the drive wheel 84 is rotated.

It should be noted that if the chamber intake and discharge conduits 20 and 24 were to be closed simultaneously by the valve means the pressure within the low pressure tank 14 would gradually build up due to the compression of the sea water within the chamber intake conduit 20 and any space that may exist between the bottom of the piston cylinder 16 and the end of the piston 78 at the beginning of the first cycle. This build up of pressure within the pressure tank 14 may be relieved by a tank pressure valve 88 or a pump 90 which is interconnected between the tank discharge conduit 26 and the outside sea water environment. The present invention has eliminated the necessity of using either the valve 88 or the pump 90, however, by making the plunger opening 38 slightly smaller in diameter than the plunger opening 40 so that the chamber intake conduit 20 will close for a short interval of time prior to the opening of the tank intake conduit 22. This interval of time can be readily visualized by referring to FIG. 3 wherein the chamber intake conduit 20 has just been closed and the tank intake conduit 22 will not open until the cams have been rotated 10 degrees more than the position shown in FIG. 3. It should be noted that during this 10 degree interval the plunger opening 42 maintains the chamber discharge conduit 24 in an open position so that an additional driving force is required to move the piston 80 against the sea pressure realized through the chamber discharge conduit 24. The differential in pressure to be overcome between the piston cylinders 16 and 18 will progressively increase during this 10 degree interval as the sea pressure is relieved within the piston cylinder 16 and the additional driving force required may be accomplished by constructing the cams 54 and 56 or the driving wheel 84 with a sufficient mass so as to act as a flywheel. During this 10 degree interval the motor will bog down but should be designed to have sufficient power to continue its rotative movement. An alternate construction to overcome the problem of pressure build-up would be to construct piston 78 with a slightly smaller diameter than piston 80 so that piston 80 will pump slightly more water volume than piston 78.

The operation of the pressure reducing pumping system 10 can be readily visualized by referring to FIGS. 2 through 6. As shown in FIG. 2, the pumping system is within the first cycle of operation with the cams 54 and 56 rotated 20 degrees from the zero reference mark 68. In this position the chamber intake and discharge conduits 20 and 24 have just opened, the piston 78 has commenced taking water within the piston cylinder 16 and the piston 80 has commenced discharging water from the piston cylinder 18. As shown in FIG. 3, the pumping system is still within the first cycle of operation with the cams rotated 170° from the zero reference mark.

Figure 5:
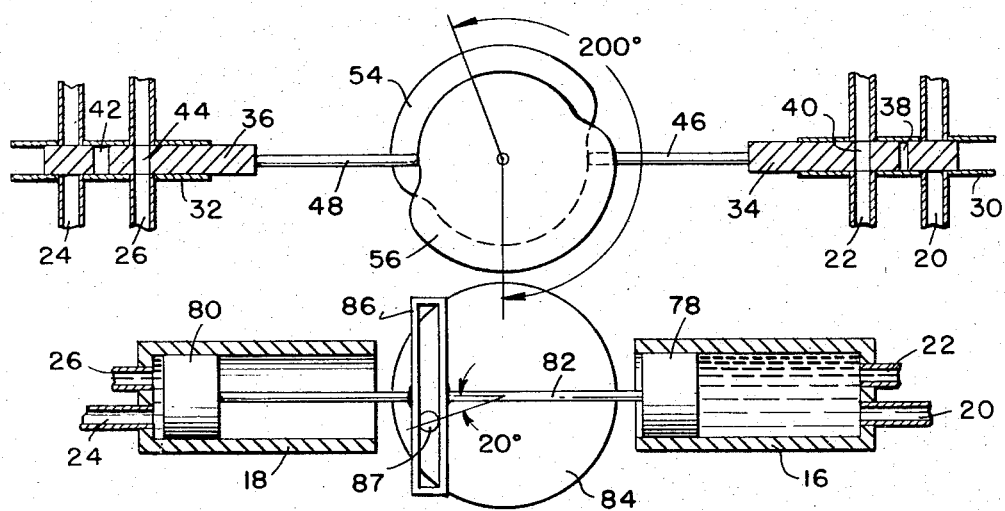
Figure 6:
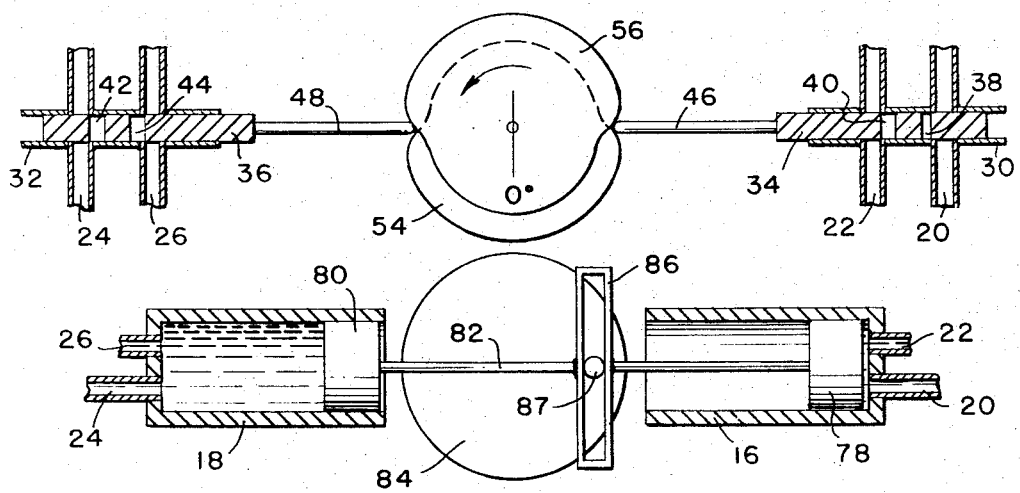

In this position the chamber intake conduit 20 has just been closed off, the chamber discharge conduit 24 is still open for another 10 degree interval, the piston 78 is relieving the sea pressure within the piston cylinder 16 and the piston 80 is still discharging sea water from the cylinder 18. As shown in FIG. 4, the pumping system has just completed the first cycle of operation and is commencing the second cycle of operation with the cams rotated to a position 180° from the zero reference mark. In this position all of the conduits 20, 22, 24 and 26 have been closed off and the pressure within the piston cylinder 16 and the chamber intake conduit 20 have been equalized to the pressure within the low pressure tank 14. As shown in FIG. 5, the pumping system has started within the second cycle of operation with the cams rotated to a position 200° from the zero reference mark. In this position the tank intake and outlet conduits 22 and 26 have just completely opened and the piston 78 has commenced discharging sea water from the cylinder 16 into the tank 14 and the piston 80 has commenced withdrawing water from the tank 14 into the cylinder 18. As shown in FIG. 6, the pumping system has just completed the second cycle of operation and is ready to commence the first cycle of operation with the cams located exactly at the zero reference mark. In this position the valve means is located in the same position as that shown in FIG. 4.

During the operation of the pumping system oxygenated sea water may be taken from the low pressure tank 14 and fed to a processing means (not shown) by a feed line 92 and the deoxygenated sea water may be returned to the tank 14 by a return line 94. In this manner oxygen may be recovered from the sea water to supply a suitable atmosphere for personnel which man the undersea chamber 12. The low pressure tank 14 may have a pressure which is equal to the pressure within the chamber 12 or may be at any other pressure which is compatible with the oxygen recovery processing means.

It is now readily apparent that the present invention provides a novel and economical pressure reducing pumping system, which may be located within a low pressure undersea chamber, for circulating sea water from a high pressure outside sea water environment to a low pressure tank, which is also located within the chamber, and then returning the water to the high pressure outside sea water environment. The novel arrangement of the pumping system enables it to circulate the sea water without having to pump against the pressure differential between the outside sea water environment and the low pressure within the chamber 12.

Obviously many modifications and variations of the present invention are possible in the light of the above teachings. It is therefore to be understood that within the scope of the appended claims the invention may be practiced otherwise than as specifically described.

We claim:
1. A pressure reducing pumping system for circulating a fluid from a high pressure fluid source to a low pressure fluid source and then returning the fluid to the high pressure fluid source comprising;
 piston cylinder means;
 a pair of conduits connected to the piston cylinder means and communicating said piston cylinder means with the high pressure fluid source;
 another pair of conduits connected to the piston cylinder means, this pair of conduits being in communication with one another and communicating the piston cylinder means with the low pressure fluid source;

valve means for opening the high pressure conduits substantially simultaneously and closing the low pressure conduits during one cycle of operation, and closing the high pressure conduits and opening the low pressure conduits during another cycle of operation; and means synchronized with the valve means and including piston means disposed within said piston cylinder means for simultaneously taking fluid in and discharging fluid from the piston cylinder means through the high pressure conduits during said one cycle of operation and circulating fluid through the pair of low pressure conduits during the other cycle of operation.

2. A pressure reducing pumping system as claimed in claim 1 wherein:

the piston cylinder means includes a pair of opposed piston cylinders; and the piston means includes a pair of pistons with each piston being disposed within a respective piston cylinder and a rigid piston rod connected between said pistons.

3. A pressure reducing pumping system as claimed in claim 2 wherein:

one of the high pressure conduits and one of the low pressure conduits are connected at one end of one of the piston cylinders; and the other high pressure conduit and the other low pressure conduit are connected at one end of the other piston cylinder.

4. A pressure reducing pumping system as claimed in claim 1 wherein:

said valve means closes one of the high pressure conduits a short interval prior to opening one of the low pressure conduits.

5. A pressure reducing pumping system as claimed in claim 4 including:

flywheel means connected to the piston means for overcoming the high pressure in the piston cylinder means just prior to the closing of said other high pressure conduit.

6. A pressure reducing pumping system located within a low pressure undersea chamber for circulating sea water from a high pressure outside sea water environment to a low pressure tank which is also located within the chamber and then returning the water to the high pressure outside sea water environment comprising:

a pair of piston cylinders, located within said chamber, one cylinder being a chamber intake cylinder and the other being a chamber discharge cylinder;

a pair of conduits connected to the intake cylinder, one conduit being a high pressure chamber intake conduit and opening through said chamber to the outside sea water environment and the other conduit being a low pressure tank intake conduit and opening into said tank;

a pair of conduits connected to the discharge piston cylinder, one conduit being a high pressure chamber discharge conduit and opening through said chamber to the outside sea water environment and the other conduit being a low pressure tank discharge conduit and opening into said tank;

valve means connected to said conduits for opening the high pressure intake and discharge conduits and closing the low pressure tank inlet and discharge conduits during one cycle of operation and closing the high pressure chamber intake and discharge conduits and opening the low pressure tank inlet and discharge conduits during another cycle of operation;

means, synchronized with the valve means and including interconnected pistons disposed within said piston cylinders, for taking sea water into said intake cylinder through the high pressure chamber intake conduit and discharging sea water from the discharge cylinder through the high pressure chamber discharge conduit during said one cycle of operation and discharging water from the intake cylinder into the tank through the low pressure tank inlet conduit and withdrawing water from the tank into the discharge cylinder through the low pressure tank discharge conduit during the other cycle of operation.

7. A pressure reducing pumping system as claimed in claim 6 wherein:

said valve means closes the high pressure chamber intake conduit for a short interval prior to opening the low pressure tank intake conduit, whereby the pressure in the chamber intake cylinder due to communication with the sea environment is reduced.

8. A pressure reducing pumping system as claimed in claim 7 including:

flywheel means connected to the pistons for overcoming the high pressure in the chamber discharge cylinder just prior to the closing of the high pressure chamber discharge conduit.

9. A pressure reducing pumping system as claimed in claim 6 wherein:

the piston cylinders oppose one another and a rigid piston rod is connected between the pistons; and a rotatable driving means connected to said piston rod.

10. A pressure reducing pumping system as claimed in claim 9 wherein:

said driving means is also connected to said valve means for driving said valve means.

References Cited by the Examiner

UNITED STATES PATENTS

| | | | |
|---|---|---|---|
| 714,604 | 11/1902 | Petsche | 103—171 |
| 2,441,797 | 5/1948 | Carnahan | 103—227 X |
| 2,998,781 | 9/1961 | Triebel | 103—227 X |
| 3,163,985 | 1/1965 | Bouyoucos | 60—51 |

ROBERT M. WALKER, *Primary Examiner.*